Patented Dec. 19, 1950

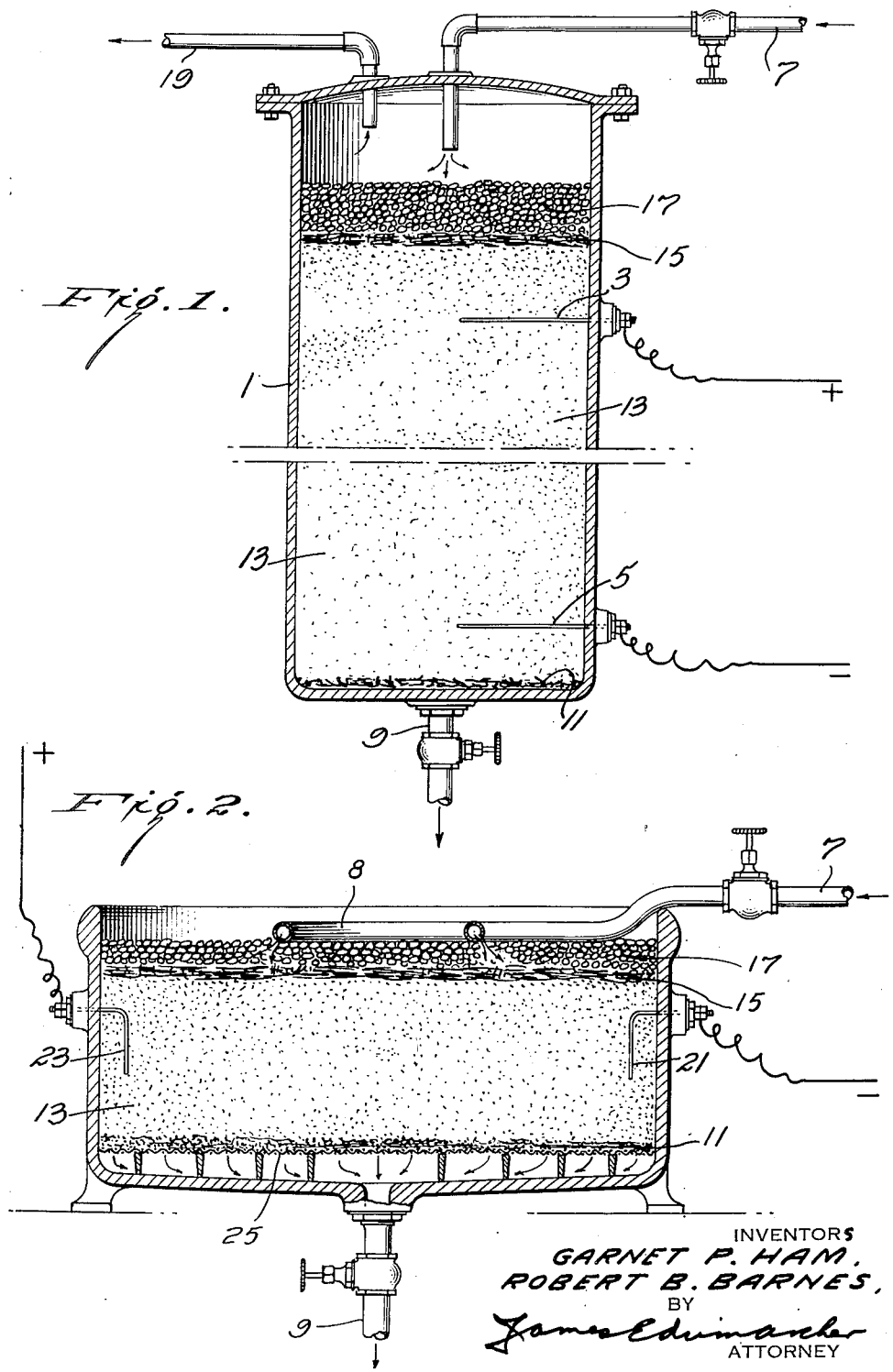

2,534,907

UNITED STATES PATENT OFFICE 2,534,907

PROCESS OF PURIFYING HYDROCARBON LIQUIDS

Garnet Philip Ham, Old Greenwich, and Robert Bowling Barnes, Stamford, Conn., assignors to American Cyanamid Company, New York, N. Y., a corporation of Maine Application January 19, 1945, Serial No. 573,613

3 Claims. (Cl. 204—188)

This invention relates to an improvement in the purification of liquid hydrocarbons. More particularly, it relates to the removal of metallic compounds from hydrocarbon liquids, such as the removal of copper compounds from liquid hydrocarbons which have been subjected to the "Perco" or similar sweetening processes.

The sweetening process is essential in the preparation of a high-grade gasoline in that it considerably improves the product as to odor, color and sulfur content. After undergoing a sweetening process, gasoline and other petroleum distillates retain objectionable amounts of copper compounds, which cannot be removed by economical means, and which prevent safe storage without further treatment which is relatively expensive. The presence of copper compounds in as low a concentration as two parts per million promotes a gum formation which renders it unsuitable for conventional purposes. The injurious effect of the copper is decreased by the use of inhibitors which lessen the tendency of copper to promote gum formation but the effectiveness of the inhibitor is at times decreased as a result of a reaction between the inhibitor and the copper compound and thus safe storage of the gasoline is not assured.

Numerous liquid hydrocarbons, derived as by-products in the petroleum industry find use as solvents in various fields of chemistry. The usefulness of these solvents would be considerably enhanced if the metallic impurities be substantially removed from such solvents. In the manufacture of organic chemical products, liquid hydrocarbons are frequently used as solvents and very often considerable difficulty arises from the use of solvents which are contaminated by metallic impurities. From the standpoint of economy and/or lack of sufficient equipment, the contaminated solvents are used without purification by distillation or other time-consuming methods. Consequently the finished product is liable to fall below required or desired standards. The presence of impurities in solvents used in the manufacture of chemicals or chemical products may affect the yield, lower the melting point or cause a discoloration of the final product, thereby requiring additional steps in purifying or reprocessing such product to make it marketable, thus causing an increase in cost of the product.

It is therefore an object of this invention to overcome the difficulties mentioned above and to provide a method by which liquid hydrocarbons may be substantially freed from metallic impurities readily and economically.

This and other objects are attained by contacting a liquid hydrocarbon containing metallic impurities with an insoluble, granular, anion active material, such as by passing a liquid hydrocarbon containing metallic impurities through a bed of an anion active resin (sometimes called "anion exchange resins").

The term "liquid hydrocarbon," as used herein, is intended to cover such substances as petroleum distillates (including gasoline, kerosene, naphthas, lubricating oils, etc.) and the organic solvents such as benzene, xylene, toluene, phenols and terpenes.

Copper salts may be removed by anion active resins from polar solvents where the removal is accomplished through the treatment of the copper solution with ammonia. The present invention differs from this in that the copper compounds may be removed from a non-polar medium and the step requiring an ammoniacal treatment can be eliminated.

Our invention also contemplates the use of an electrically polarized anion active material. For this purpose, the apparatus shown in the drawings is suitable, although this is only one example of many types of apparatus which may be employed.

Figure 1 is a side elevation view of one form of apparatus in which our process may be carried out, the apparatus being shown partially in cross section.

Figure 2 is the same type of view as Figure 1 but is a slightly different form of apparatus which is adapted for our purpose.

The construction of the apparatus, as well as the understanding of the operation of our process will be apparent from the following:

A suitable vessel or container 1 is preferably constructed of glass, porcelain or, if constructed with metal, it is preferably lined with glass, rubber or porcelain. An electrode 3, preferably a platinum electrode, is placed near the top of vessel 1 and it extends either a short distance or substantially entirely across the vessel. A similar electrode 5 is inserted near the bottom of the vessel 1. The electrodes 3 and 5 are suitably insulated from the vessel 1 if the latter is metallic. A high tension D. C. potential is applied to the electrodes 3 and 5 by any suitable means. Preferably, the electrode near the top of the vessel 1 is made the anode, while the electrode near the bottom of the vessel 1 is made the cathode. The electrodes 3 and 5 may be in the form of a wire or rod, or they may be in the form of a screen or foraminous plate which partly or completely covers the horizontally cross sectional area of the vessel 1. A feed conduit 7 is connected into the top of vessel 1 while an outlet conduit 9 is connected into the bottom of vessel 1. Both conduits 7 and 9 may be constructed of materials similar to those specified for vessel 1.

A relatively thin layer of glass wool 11 may be placed in the bottom of the vessel 1 and on top of the glass wool a granular material 13 is well packed in order to avoid the channeling of the fluid passing through the apparatus. On the top of the resin another layer of glass wool 15 is placed and this in turn is followed by a layer of glass beads 17. Optionally, an overflow pipe 19 is connected into the top of the vessel 1.

Hydrocarbon liquids containing metallic impurities flow in through conduit 7 down through the granular material in vessel 1 and out through conduit 9. During the passage of the liquid, a high tension D. C. potential is applied to electrodes 3 and 5. The effluent flowing from conduit 9 has a substantially lower metallic impurity content than the feed which flows in through conduit 7.

In Figure 2, container 1 is shown as a relatively shallow vessel as compared to vessel 1, Figure 1, where the vessel is represented as a relatively long column. The feed pipe 7 in Figure 2 is connected with a perforated distributor conduit 8 which may be formed into a circle. The container 1 is provided with an outlet conduit 9. In Figure 2, electrodes 21 and 23 are inserted into the side of container 1 preferably diametrically opposite each other. A supporting screen, grate or other foraminous support is placed in the bottom of container 1. On top of the support 25 a layer of glass wool 11 is placed, followed by well-packed, granular material 13 and this in turn is followed by another layer of glass wool 15 on top of which is a layer of glass beads 17. The operation of the apparatus shown in Figure 2 is apparent from the description of the operation of the apparatus in Figure 1. The container 1, conduits 7, 8 and 9, and support 25 may be constructed of metal, porcelain, glass, synthetic resin, or many other desired materials. If metal be used, it is preferable that it be lined with glass, porcelain or rubber.

The following examples, in which the proportions are in parts by weight, except where otherwise indicated, and in which the anion active resin employed is resin A, are given by way of illustration and not in limitation.

*Example 1*

Gasoline, containing copper naphthenate equivalent to 20 P. P. M. of copper as impurity, is passed through a water-wet bed of anion active resin, ¾" in diameter and 17½" high, contained in a glass column. The gasoline is passed through at a rate of 8 ml. per minute. A clear, water-white effluent is obtained. Following this procedure, a sample was analyzed spectroscopically, after a total of 115 ml. had passed through the bed, and was found to contain only 2 P. P. M. of copper.

*Example 2*

A "straight run" white gasoline, containing copper naphthenate equivalent to 2 P. P. M. of copper, is passed through a water-wet bed of anion active resin, ¾" in diameter and 17½" long, at a rate of 8 ml. per minute. A clear, water-white effluent is obtained. Following this procedure, a spectrographic analysis of the effluent showed that it contained only 0.2 P. P. M. of copper.

*Example 3*

A quantity of an anion active resin is vacuum dried for 24 hours, then washed with absolute alcohol and vacuum dried for 7 hours at 100° C. The resin is then placed in a column to form a bed ¾" in diameter and 17½" long.

A "straight run" white gasoline, containing copper naphthenate equivalent to 2 P. P. M. of copper impurity, is passed through the bed of anion active resin, prepared in the manner described above, at a rate of 8 ml. per minute. A clear, water-white effluent is obtained and when this procedure was followed and the effluent was tested spectographically it was found that the effluent contained only about 0.1 P. P. M. of copper.

*Example 4*

The procedure of Example 2 is followed, except that the gasoline is passed through a bed of anion active resin which is contained in an apparatus of the type shown in Figure 1 and which is polarized by the application of 1140 volts to electrodes 3 and 5. These electrodes are preferably platinum. A water-white effluent is obtained which contains no copper when examined spectrographically.

Examples of suitable anion active resins which may be used in accordance with our invention are n-phenylene diamine-formaldehyde resins, biguanide-formaldehyde resins, guanyl urea-formaldehyde resins, polyamine-formaldehyde resins, alkyl and aryl substituted guanidine-formaldehyde resins, alkyl and aryl substituted biguanide-, and guanyl urea-formaldehyde resins, etc. Corresponding condensation products of other aldehydes, e. g. acetaldehyde, crotonaldehyde, benzaldehyde, furfural or mixtures of aldehydes may also be employed if desired. The resins such as those prepared from the guanidine, guanyl urea, biguanide, the polyamines, and other materials which do not form substantially insoluble condensation products with formaldehyde for most practical purposes are preferably insolubilized with suitable materials, e. g., urea, aminotriazines especially melamine, the guanamines which react with formaldehyde to produce insoluble products, etc. Furthermore, mixtures of the active materials as well as mixtures of the insolubilized materials may be used. Some of the anion active resins may be prepared in the same general manner as that described in Patents Numbers 2,251,234 or 2,285,750. Usually it is convenient to employ the salts of the bases such as guanidine but the free bases may also be used. Examples of suitable salts for use in preparation of anion active resins are: guanidine carbonate, guanidine sulfate, biguanide sulfate, biguanide nitrate, guanyl urea sulfate, guanyl urea nitrate, guanyl urea carbonate, etc.

*The preparation of resin "A"*

24 parts of urea
26 parts of guanidine nitrate
98 parts of formalin (37% formaldehyde in water)
6.1 parts of water
6.3 parts of soda ash The water, formalin and soda ash are charged into a kettle, preferably glass-lined, and equipped with a reflux condenser and an agitator. The urea and guanidine nitrate are then added and the resulting mixture is heated to the reflux point and maintained at this point for about 1-6 hours. During this operation, the mixture is thoroughly agitated. This mixture is transferred to a suitable vessel, preferably glass-lined, and heated to about 90° C. To this, with vigorous agitation, about 3.6 parts of hydrochloric acid (specific gravity 1.19) in about 6.1 parts of water are added gradually and the material is then cooled as quickly as possible to about 70° C., thereby gelling the material. The gelled material should be further cooled, optionally by removing it from the vessel, breaking up into small pieces and spreading out on trays. The resulting material is ground to any desired fineness, e. g. a size that will pass 8 mesh.

The ground gel is distributed evenly on trays, preferably glass-lined, and these trays are placed in a suitable drier. The temperature is raised to about 50° C., held for about 5-6 hours, then raised about 10° every half hour until about 100° C. is reached and is maintained at the latter temperature for about 2 hours. If necessary, the material may be reground or screened to a suitable size.

The anion active resins may be activated or regenerated by passing a dilute solution, e. g. 0.1%-5% of sodium carbonate, caustic soda, potassium carbonate, potassium hydroxide, organic bases and the like, through the bed and subsequently washing with water.

Instead of passing the liquid hydrocarbon through a bed or column of anion active material, the liquid may be agitated in a suitable vessel with a sufficient quantity of the anion active material to achieve the desired result, and if the material is electrically polarized, said vessel may contain electrodes to which a high potential is applied, or said anion active material may have been previously subjected to a high electrical potential. Furthermore, our invention contemplates the use of any number of beds of anion active material as well as recirculation of the effluent through one or more of these beds.

The electric current which is applied to the anion active resin is preferably from about 100 volts D. C. to about 2000 volts D. C. and even higher voltages may be employed, if desired.

Among the metallic impurities which may be removed from hydrocarbon liquids are, for example, salts of copper, iron, nickel, cobalt, zinc, lead, cadmium, aluminum, etc. Our process is of particular utility in the removal of those metals which have relatively insoluble metal hydroxides. The metallic impurity may be present in the liquids in the form of soluble salts in solution, or in the form of colloidal particles of metal or metallic salt. While our process has the general utility set forth above, it is of special importance in removing copper from petroleum distillates which have been copper sweetened and which contain sufficient copper to render such distillates unstable. By means of our process sufficient copper may be removed to render the distillate stable.

Obviously many modifications and variations in the processes and compositions described above may be made without departing from the spirit and scope of the invention as defined in the appended claims.

We claim:

1. A process of removing impurities, including copper, from gasoline comprising passing gasoline containing copper through a bed of an anion active resin which is an insolubilized guanidine-urea-formaldehyde resin.

2. A process, as in claim 1, wherein the anion active resin is polarized by means of a high tension D. C. potential.

3. A process for removing impurities in the form of metallic substances from hydrocarbon liquids comprising passing a non-aqueous liquid hydrocarbon containing, as an impurity, a compound of a metal which has a relatively insoluble metal hydroxide through a bed of an anion active resin, which resin is polarized by means of a high tension D. C. potential.

GARNET PHILIP HAM.
ROBERT BOWLING BARNES.

REFERENCES CITED

The following references are of record in the file of this patent:

UNITED STATES PATENTS

| Number | Name | Date |
|---|---|---|
| 1,377,021 | Mumford | May 3, 1921 |
| 2,045,465 | Hassler | June 23, 1936 |
| 2,336,542 | Hatfield | Dec. 14, 1943 |
| 2,341,329 | Myers | Feb. 8, 1944 |
| 2,351,445 | Morgan | June 13, 1944 |
| 2,367,803 | Schindler | Jan. 23, 1945 |
| 2,368,261 | Neef | Jan. 30, 1945 |
| 2,413,844 | Rawlings | Jan. 7, 1947 |